United States Patent [19]

Matthew et al.

[11] 4,264,083
[45] Apr. 28, 1981

[54] SPLASH GUARD

[75] Inventors: Kenneth S. Matthew, Northbrook; Harry J. Dickey, Bellwood, both of Ill.

[73] Assignee: Custom Accessories, Inc., Lincolnwood, Ill.

[21] Appl. No.: 68,729

[22] Filed: Aug. 22, 1979

Related U.S. Application Data

[63] Continuation-in-part of Ser. No. 60,977, Jul. 26, 1979.

[51] Int. Cl.³ .............................................. B62B 9/14
[52] U.S. Cl. ........................... 280/154.5 R; 24/73 SC; 24/81 FT; 24/150 P; 298/1 SG
[58] Field of Search .............. 280/154.5 R; 24/73 BC, 24/73 SC, 73 SM, 81 FT, 241 S, 255 SC, 150 R, 150 P; 298/1 SG

[56] References Cited

U.S. PATENT DOCUMENTS

| | | | |
|---|---|---|---|
| 2,077,818 | 4/1937 | Zaiger | 280/154.5 R |
| 3,279,818 | 10/1966 | Jones | 280/154.5 R |
| 3,711,119 | 1/1973 | Hollingsworth | 280/154.5 R |

OTHER PUBLICATIONS

Tinnerman Products, Inc., Bulletin No. 359, p. 18, printed 1961.

Primary Examiner—John P. Silverstrim
Assistant Examiner—John A. Carroll
Attorney, Agent, or Firm—Wallenstein, Spangenberg, Hattis & Strampel

[57] ABSTRACT

A splash guard or mud flap comprising a flexible, splash-intercepting body portion which may be fabricated of a material such as rubber or plastic or metal, and which is supported on and maintained in a preselected position on the fender of a vehicle by means of anchoring members adapted to be engaged along the fender of the vehicle. The anchoring members have a projection or pin-like member thereon for engaging and retaining the flexible, splash-intercepting body portion on the anchoring members. In a preferred embodiment of the splash guard, the body portion is fabricated of a material such as rubber or plastic which can be fully penetrated by the pin-like member utilizing only finger pressure. Locking means in the form of a push-on type nut advantageously is provided for the members. The splash guard, in its preferred form, can quickly and properly be positioned on the fender of a vehicle without the need for any tool.

23 Claims, 17 Drawing Figures

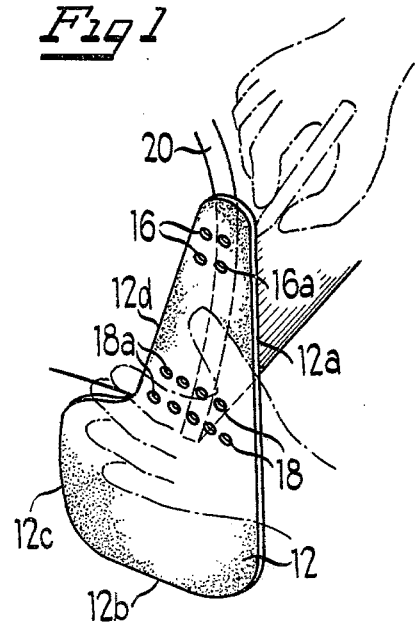
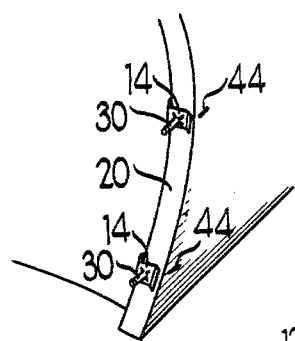
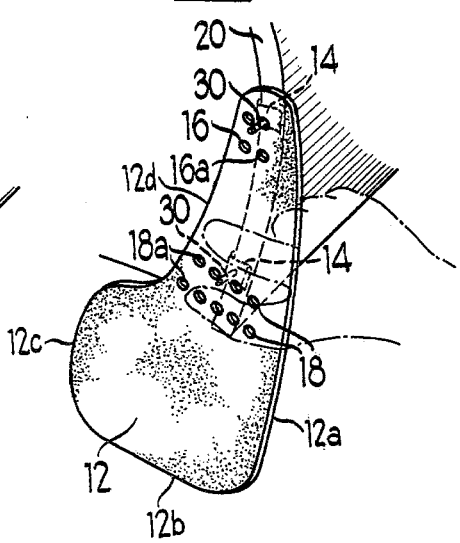
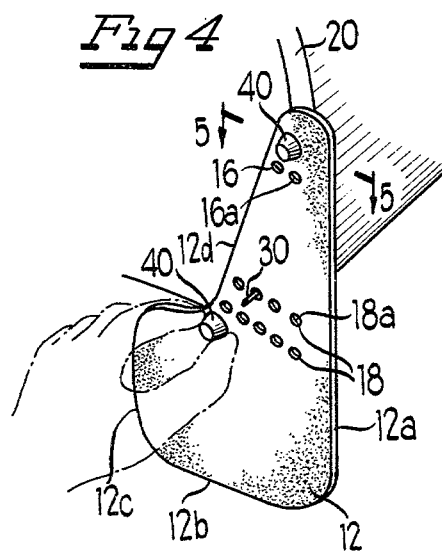
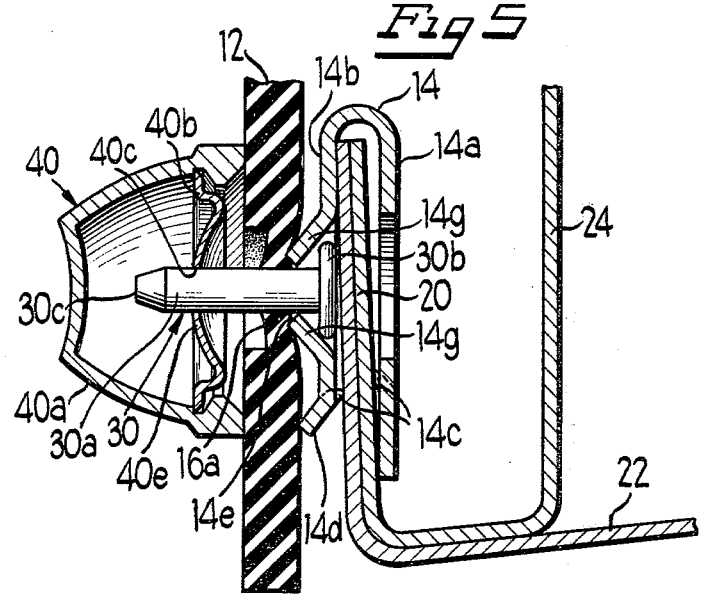
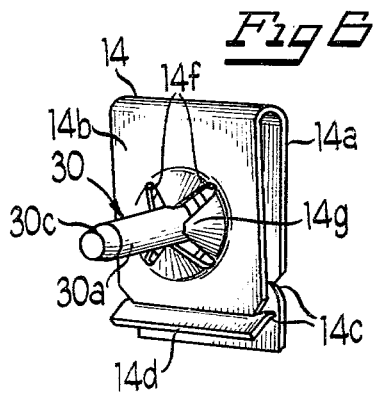
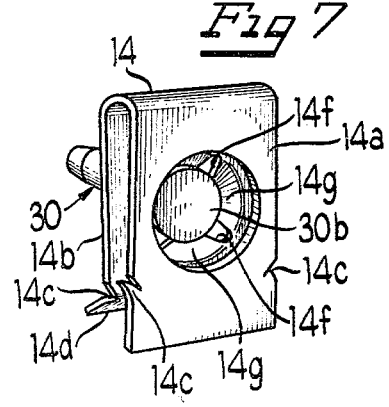

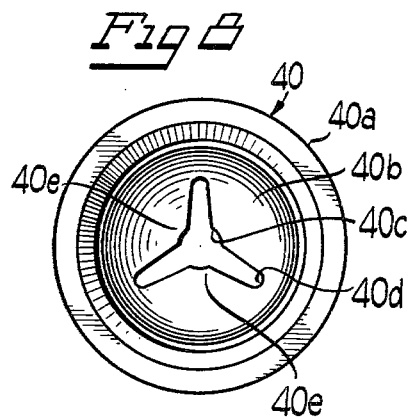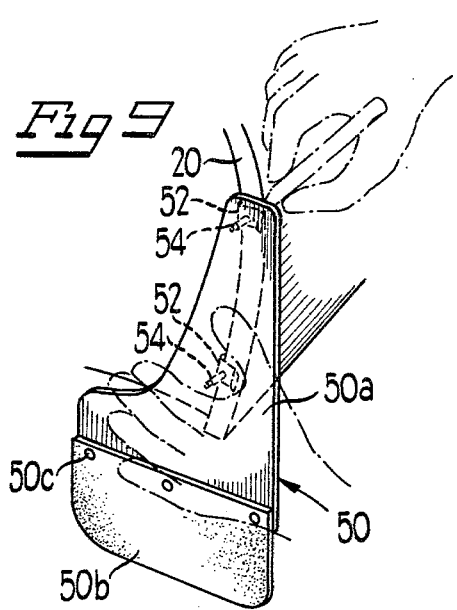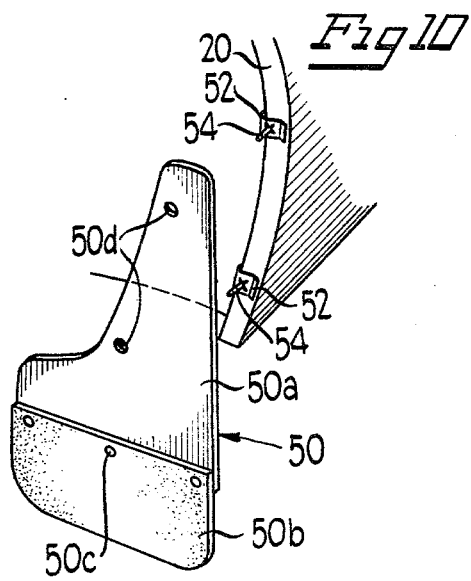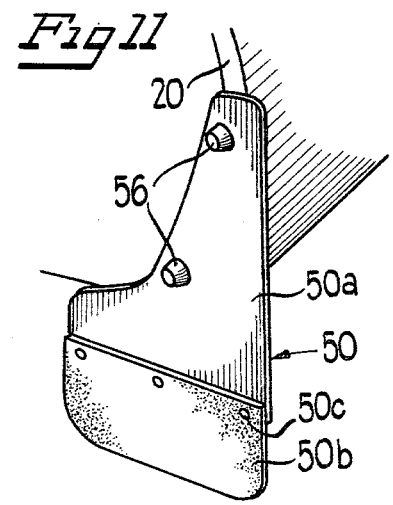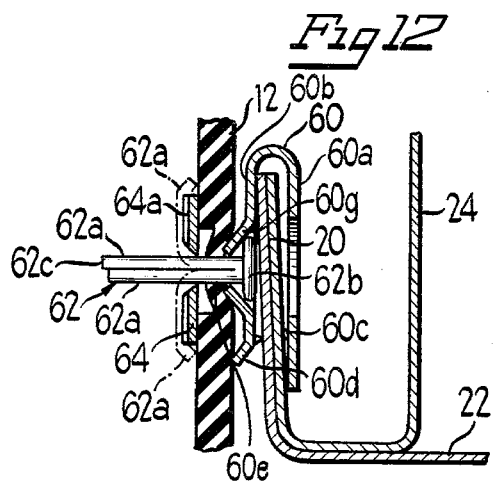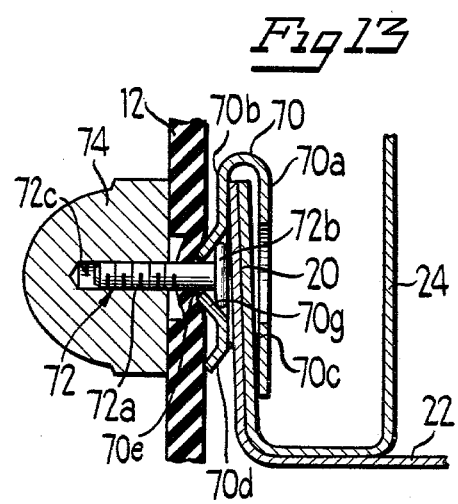

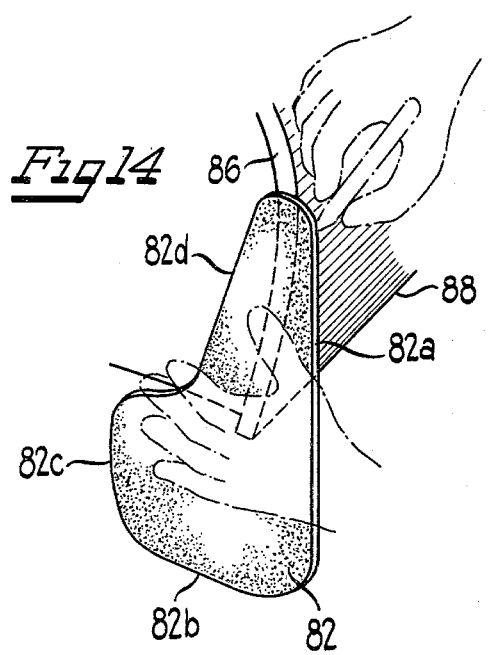
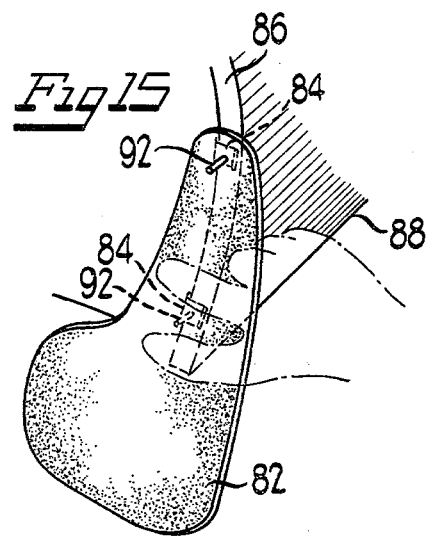
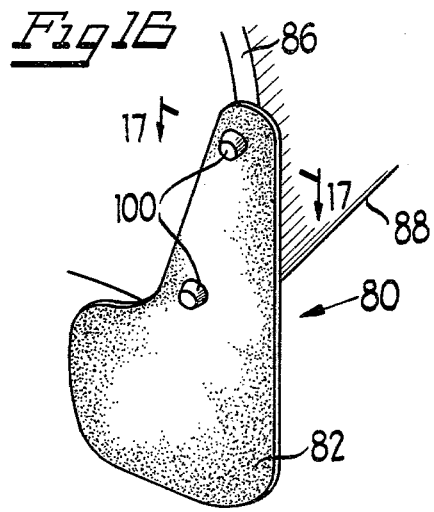
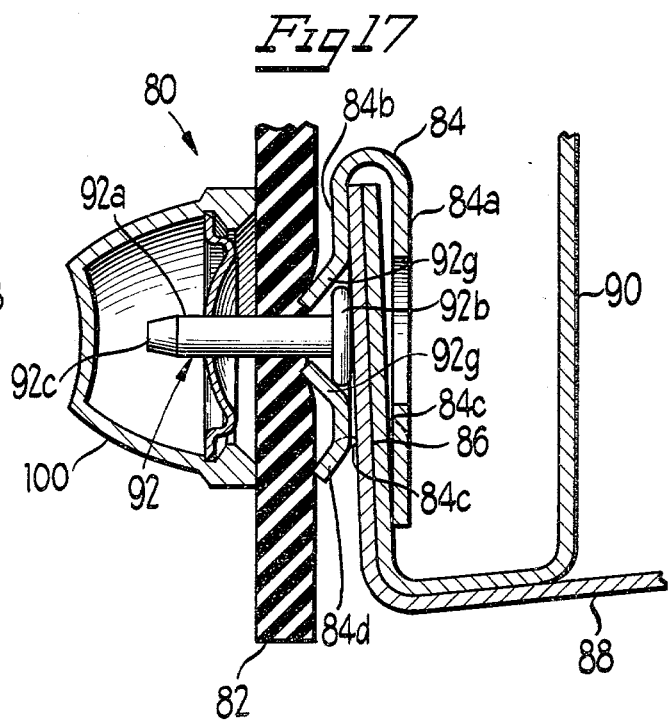

SPLASH GUARD

This application is a continuation-in-part of application Ser. No. 060,977, filed July 26, 1979.

The present invention relates to an improved splash guard, or mud flap, particularly, a splash guard or mud flap of the type used on the fenders of passenger vehicles, vans, pickup trucks, or the like.

Heretofore, splash guards have commonly been attached to the fenders of vehicles by means of screws. Such guards are provided with pre-drilled holes along the inner margin thereof, and require a person applying the guards to the fender of a vehicle to first drill holes through the in-turned flange of the fender of a vehicle, the holes, of course, being aligned with the preformed holes in the splash guard as purchased. Guards of this type have the obvious disadvantage of requiring special tools for their installation, and more importantly to the owner of the vehicle, they require that holes be drilled in the flange of the fender. Other splash guards presently available on the market utilize clamps for securing the splash guards on fenders. However, the clamps require a certain amount of manipulation and, moreover, cannot be used on all vehicles because the contours and curvature of the inner edges of fenders vary widely in accordance with the make of the vehicle. More recently, a splash guard has been placed on the market which utilizes a steel, S-shaped spring clip to support a rubber, or rubber-like mud flap on the fender of a vehicle. A portion of the clip is attached to the inwardly extending flange of the fender of a vehicle and an arm of the clip is adapted to be inserted through a slit cut in a slot provided in the mud flap of the splash guard. This guard has the important disadvantage of requiring the installer to use a sharp edge such as a knife to slit the rubber mud flap of the guard in order to be able to attach it to an arm of the S-shaped clip. When the mud flap is in position on the arm of the clip, the edges of the arm present sharp contact points which, in time, due to movement of the flap as the vehicle travels along the road, cause the rubber material of which the flap is made to tear thereby appreciably reducing the useful life of the splash guard.

In accordance with the present invention, an improved splash guard has been evolved which eliminates the aforementioned disadvantages of conventional splash guards. Its simple, safe construction enables it to be installed on the fender of a vehicle by even the least mechanically inclined individual without the need for any kind of a tool. Its construction, furthermore, enables it to be installed on the fender of substantially any make of vehicle irrespective of the contours and curvature of the fender of the vehicle.

The splash guard or mud flap of the present invention, in brief, comprises a flexible, splash-intercepting body portion which, in a preferred embodiment, is fabricated of rubber, or a rubber-like, or plastics material, and resilient anchoring means adapted to be engaged along the fender of a vehicle for supporting and positioning the body portion thereon. The anchoring means has a generally U-shaped configuration, and is provided on an arm thereof with an outwardly extending pin-like member for engaging and retaining the body portion of the anchoring means. The pin-like member in its preferred form comprises a solid extension or stud having a bluntly tapered end capable, under finger pressure, of completely penetrating the material of the body portion of the splash guard. Fastening means, preferably in the form of a speed or push-on nut, is positioned on the outer, free end of the pin-like member to essentially permanently lock the body portion on the anchoring means. In accordance with another aspect of the invention, the body portion of the splash guard desirably is provided with a plurality of rows of spaced, preferably circular or round areas of reduced thickness. The rows are arranged on a surface of the body portion to serve as convenient guide means for positioning the anchoring means along the fender of a vehicle and for orienting the body portion with relation to both the anchoring means and the curvature of the fender. The reduced thickness of the circular or rounded areas on the body portion are easily penetrated by the pin-like member of the anchoring means with only moderate finger pressure.

While in the preferred embodiment of the invention the body portion is fabricated of a material such as rubber, or a rubber-like, or plastics material, the present invention encompasses a splash guard having a metal, or the like, body portion. In this form, the metal body portion is provided with holes for receiving the pin-like member of the anchoring means.

The foregoing, and other features and advantages of the splash guard will become clearer from the following description, taken in conjunction with the accompanying drawings wherein:

FIG. 1 is a view in perspective showing the body portion of an embodiment of the splash guard being used to determine the proper positioning of the anchoring means on the fender of a vehicle with the aid of guide means on the body portion;

FIG. 2 is a view in perspective showing the anchoring means of the splash guard in position on the flange of the fender of a vehicle;

FIG. 3 is a view in perspective showing the pin-like member of the anchoring means being inserted through the material of the body portion of the splash guard with only finger pressure;

FIG. 4 is a view in perspective showing push-on type nuts being positioned on the pin-like members of the anchoring means;

FIG. 5 is an enlarged fragmentary sectional view taken substantially along line 5—5 of FIG. 4;

FIG. 6 is a view in perspective of the front side of an embodiment of the anchoring means;

FIG. 7 is a view in perspective of said embodiment of the anchoring means as viewed from the rear;

FIG. 8 is a plan view of an embodiment of a push-on type nut for use in securing the body portion on the anchoring means;

FIG. 9 is a view in perspective showing a metal body portion being marked for drilling prior to its being positioned on the anchoring means;

FIG. 10 is a view in perspective of the metal body portion shown in FIG. 9 with holes formed therethrough for receiving the pin-like members of the anchoring means;

FIG. 11 is a view in perspective corresponding to the views of FIGS. 9 and 10 showing the splash guard mounted on a fender of a vehicle;

FIG. 12 is an enlarged fragmentary sectional view showing an embodiment of the anchoring means wherein the pin-like member has separable leg portions which are bent back over a washer or the like engaged on the pin-like member;

FIG. 13 is an enlarged fragmentary sectional view showing an embodiment of the anchoring means wherein the pin-like member is threaded for receiving a nut for retaining the body portion on the anchoring means;

FIG. 14 is a view in perspective of an embodiment of the body portion of the splash guard, without guide means provided thereon, being used to determine the proper positioning of the anchoring means on the fender of a vehicle;

FIG. 15 is a view in perspective showing the pin-like members of the anchoring means being inserted through the material of said embodiment of the body portion of the splash guard with only finger pressure;

FIG. 16 is a view in perspective showing said embodiment of the body portion secured in position on the fender of a vehicle with push-on type caps or nuts; and FIG. 17 is an enlarged fragmentary sectional view taken substantially along line 17—17 of FIG. 16.

Referring, now, in greater detail to FIGS. 1 through 7 of the drawings, the embodiment of the splash guard illustrated comprises a flexible, splash-intercepting body portion 12 and anchoring elements or units, or clasps 14—14. The body portion 12 advantageously is fabricated of rubber, or a rubber-like composition, or a plastics material. The shape of the body portion can vary. However, the shape of the body portion 12 shown most nearly enables the splash guard of the present invention to be properly positioned on the fenders of substantially any make of vehicle.

As illustrated, the body portion 12 has an elongated outer side 12a, a bottom side 12b and an inner, so-called short side 12c. The upper end of the sides 12a and 12c are joined to an upwardly and outwardly slanted inner side 12d which is curved inwardly at its lower end where it joins the short side 12c of the body portion. In the embodiment of the body portion 12 shown, two substantially vertically spaced rows, namely, upper rows 16—16 and lower rows 18—18, of spaced, round or circular areas 16a and 18a, of reduced body portion material thickness are formed in the body portion 12, the purpose of which will become clear as the description proceeds. It should be understood that, while rows 16 and 18 most advantageously comprise areas of reduced thickness of the material of which the body portion 12 is fabricated, the rows 16 and 18 may be comprised of openings or holes.

The anchoring units or clasps 14—14, as best illustrated in FIGS. 5, 6 and 7, have a generally U-shaped configuration, and comprise a fender engaging rear arm 14a and a fender engaging front arm 14b. The anchoring units 14—14 advantageously are formed of a resilient metal such as spring steel, and each arm 14a and 14b of the units desirably has inwardly extending teeth or spurs 14c-14c struck from along the opposite side margins thereof for resisting disengagement of the units from the fender of a vehicle after they have been positioned thereon. The free end 14d of the front arm 14b of each of the units 14—14 is angled outwardly to facilitate attachment of the units along the in-turned flange 20 formed by the fender 22 and the fender liner 24 of a vehicle, for example, as shown in FIG. 5 of the drawings.

Secured on the front arm 14b of the units 14—14 is a pin-like member 30. While the member 30 may be secured to the arm 14b in any of various ways, including welding, in the embodiment illustrated, the arm 14b of each of the units 14—14 is provided with a central opening 14e therethrough from the periphery of which a plurality of equally spaced slots 14f radiate thereby forming a plurality of outwardly extending resilient locking fingers 14g which engage the shaft 30a of the member 30. The member 30 has a head 30b which acts as a stop to prevent the member 30 from being disengaged from the fingers 14g, and the free or distal end 30c of the member 30 is bluntly tapered to make full penetration of the material of the body portion 12 easier while at the same time presenting a surface which will not pierce the human skin during installation of the splash guard on a fender of a vehicle. The tapered configuration of the end 30c also facilitates the positioning of locking means such as a speed nut or push-on cap 40 on the shaft 30a of each of the members 30 of the anchoring units 14—14. The caps 40, as illustrated, comprise a doom-shaped head portion 40a, which may be made of plastic, or the like, and a metal retaining disc 40b which is secured in position at the open end of the cap portion 40a. As best shown, in FIG. 8, the disc 40b of the cap 40 has a centrally located opening 40c from the periphery of which a plurality of equally spaced slots 40d radiate to provide a plurality of locking fingers 40e. The fingers 40e are somewhat flexible and extend slightly inwardly with respect to the head portion 40a of the cap 40. Thus, while the fingers 40e act to readily receive the shaft 30a of the member 30 when the cap 40 is engaged thereon, they strongly resist removal of the cap 40 from the shaft 30a.

As illustrated in FIGS. 1-4 of the drawings, the installation of the splash guard of this invention on a fender of a vehicle can be carried out with minimal effort on the part of the installer to provide a highly attractive, professional-looking result. The initial step in the installation involves determining the proper position of the anchoring units 14—14 on the flange 20 of the fender. This is readily accomplished by simply placing the rear face of the body portion 12 against the flange 20 with the bottom edge 12b of the body portion substantially parallel to the road surface, for example. Using the rows 16 and 18 as guides, readily removable markings 44—44, as shown in FIG. 2, are made on the fender of the vehicle with a crayon, or the like, marking instrument, opposite the rows 16 and 18. The markings, of course, can instead be made on the flange 20 if desired. The anchoring units 14—14 then are slid into position on the flange 20 at the locations indicated by the markings 44—44. The rear face of the body portion 12, as before, is aligned with respect to the units 14—14 to position the rows 16 and 18 opposite the pin-like members 30 and the bottom edge 12b substantially parallel to the road surface. When thusly aligned, one of the areas 16a and 18a comprising the rows 16 and 18 will be in alignment with the ends 30c of the pin-like members 30 of the units 14—14. The installer, using only finger pressure as represented in FIG. 3, then simply pushes the pin-like members 30 through the areas 16a and 18a which are aligned with the members 30. Thereafter, the speed nuts or push-on caps 40 are engaged on the shaft 30a of each of the members 30 as shown in FIG. 4. The body portion 12 and the head portion 40a of the caps 40 advantageously are color coordinated to enhance the attractiveness of the completed installation. It should be understood that, although the sequence of first positioning the units 14—14 on the flange of the fender and then inserting the members 30 through the body portion 12 is, perhaps, a more efficient way of installing the splash guard on a fender, the body portion 12 can, if desired, be first engaged on the pin-like members 30 of the units 14—14, and the units 14—14 thereafter positioned on the flange 20.

Referring, now, to FIGS. 9-11 of the drawings, another embodiment of the splash guard of the present invention is shown. As illustrated, the splash guard comprises a flexible body portion 50 and a pair of resilient anchoring elements or units 52—52. The units 52—52 are constructed in the same manner as the units 14—14 described above, and, therefore, to avoid any redundancy, no description of the units 52—52 will be given here. The body portion 50, however, does differ from the body portion 12 in that it comprises a metal splash-intercepting upper panel 50a and a non-metal splash-intercepting lower panel 50b is secured to the bottom margin of the panel 50a by rivets 50c. The body portion 50, of course, can be fabricated entirely of metal. Thin gauge stainless steel can be used in either case.

The installation of the splash guard shown in FIGS. 9-11 differs somewhat from the installation of the previously described guard in that no guide means such as rows 16 and 18 are provided on the metal panel 50a of the body portion 50. The body portion 50, however, can be used to determine the proper location of the anchoring units 52—52 on the flange 20 by simply holding the metal upper panel 50a of the body portion 50 against the flange 20 with the bottom margin of the lower panel 50b substantially parallel to the road surface. The units 52—52 should be spaced apart a distance on the flange 20 such that the pin-like members 54 thereof will engage the panel 50a inwardly of the inner slanted or curved margin thereof. After the units 52—52 are in place on the flange 20, the metal upper panel 50a of the body portion 50 is aligned with the members 54 and the road surface, and the point at which the members 54 make contact with the panel 50a are marked with a crayon or other suitable marking instrument on the rear surface of the panel 50a as shown in FIG. 9. Holes 50d are then drilled or punched through the panel 50a at the markings on the rear surface thereof (see FIG. 10). The members 54 of the anchoring units 52—52 are inserted through the holes 50d in the panel 50a, and speed nuts or push-on caps 56—56 are locked in place on the members 54. The completed installation is shown in FIG. 11.

In FIGS. 12 and 13 of the drawings, modifications of the anchoring means of the splash guard of the present invention are illustrated. In FIG. 12, the anchoring element or unit 60, like the units 14—14 has a generally U-shaped configuration, with a rear arm 60a and a front arm 60b each having inwardly extending teeth or spurs 60c struck from the side edges thereof. The free end 60d of the front arm 60b is angled outwardly, and the arm 60b is provided with an opening 60e therethrough. A plurality of slots (not shown) radiate from the opening 60e to provide a plurality of outwardly extending resilient fingers 60g. A pin-like member 62 having a shaft formed of separable legs 62a—62a, and a head portion 61b, extends through the opening 60e in the arm 60b and is maintained in position therein by the fingers 60g. One of the legs 62a of the member 62 is provided with an extension 62c to facilitate penetration of the body portion 12 of the splash guard and to enable the ready separation of the legs 62a—62a when they are bent back into a locking position as shown in broken lines in FIG. 12. In order to provide added surface contact with the body portion 12, a disc or washer 64 advantageously is positioned on the member 62. The washer desirably has grooves 64a formed in the outer surface thereof to receive the legs 62a—62a when they are bent back, and the diameter of the washer is such that the ends of the legs 62a—62a extend beyond the periphery of the washer 64 and can be bent farther back into enagement with the outer surface of the body portion 12.

In FIG. 13 of the drawings, the anchoring element or unit 70, like the units 14 and 60, has a generally U-shaped configuration, with a rear arm 70a and a front arm 70b each having inwardly extending fender flange engaging teeth or spurs 70c. As in the previously described embodiments, the leading or free end of the arm 70b is angled outwardly and the arm 70b has an opening 70e therethrough. A plurality of outwardly extending fingers 70g are provided for engaging the threaded shaft 72a of the pin-like member 72 having a head portion 72b positioned to the rear of the bases of the fingers 70g. The pin-like member 72 has a bluntly pointed end 72c adapted to pass through the body portion 12 of the splash guard. A capped, internally threaded nut 74 serves to secure and maintain the body portion 12 on the member 72 of the unit 70. The aforedescribed method of attaching the units 14—14 to the flange 20 of a fender 22 of a vehicle, and the body portion to the units 14—14, apply to the embodiments shown in FIGS. 12 and 13. It should be understood that the pin-like member of the anchoring means may be modified to attain a similar result. Thus, for example, the pin-like member may be in the form of a rivet, the end of which can be peened over to engage the body portion of the splash guard, or onto auxiliary fastening means such as a washer as shown in FIG. 12.

In the embodiment of the splash guard shown in FIGS. 14-17, and designated generally by reference numeral 80, the body portion 82 has essentially the same configuration as the corresponding portion of the embodiments described hereinabove, and is formed of a rubber, or rubber-like, or plastics material. Like the body portion 12 described above, the body portion 82 has an elongated outer side 82a, a bottom side 82b, an inner, short side 82c and a slanted inner side 82d. Surface ornamentation may be provided on the body portion 82 if desired.

The anchoring units or clasps 84—84 of the splash guard 80, like the units 14—14 described above, are generally U-shaped, and have a resilient, fender-engaging rear arm 84a and a resilient, fender-engaging front arm 84b. Each of the arms 84a and 84b has inwardly extending teeth or spurs 84c—84c struck from along the opposite side margins thereof, and the leading or free end 84d of the arm 84b is angled outwardly to facilitate attachment of the units 84—84 along the in-turned flange 86 formed by the fender 88 and the fender line 90 of a vehicle, for example, as shown in FIG. 17.

A pin-like member 92 is carried on the front arm 84a of each of the units 84—84, and has the same configuration and features as the pin-like member 30 of the units 14—14 described above, including a shaft 92a having a bluntly tapered free end 92c and a head 92b. Locking fingers 92g are formed in the arm 84a to maintain the pin-like member 92 in position on the units 84—84. Speed nuts or push-on caps 100—100, like the caps 40, are provided for securing the body portion 82 on the pin-like members 92 of the units 84—84.

The installation of the splash guard 80 on the fender of a vehicle involves the steps of first holding the rubber, or rubber-like, or plastic body portion 82 against the flange 86, with the bottom margin 82b substantially parallel to the road surface, for example, as illustrated in FIG. 14. Suitable markings can be made on the fender 88 or the flange 86 to indicate the position of the units 84—84 on the flange 86, also as represented in FIG. 14. The units 84—84 are then anchored to the flange 86, and the body portion 82 is positioned on the pin-like members 92 by simply exerting sufficient finger pressure to cause each of the members 92 to pierce or penetrate entirely through the material of the body portion 82 (see FIGS. 15 and 17). The speed nuts or push-on caps 100—100 are next locked in place on the members 92 to complete the installation as shown in FIG. 16.

Since this invention may be embodied in several forms without departing from the spirit or essential characteristics thereof, the preferred embodiments described are merely illustrative and are not intended to be restrictive of the scope of the invention which is set forth in the following claims, and all changes or modifications that fall within the metes and bounds of the claims or that form their functional as well as conjointly cooperative equivalents are intended to be embraced by those claims.

What is claimed is:

1. A splash guard or mud flap for attachment to the fender of a vehicle, comprising: a flexible, splash-intercepting body portion, resilient anchoring means for supporting the body portion and being adapted to be engaged along the fender of a vehicle for positioning the body portion thereon, said anchoring means including a front wall and a back wall resiliently integrally joined along one side in substantial overlying relation to one another, the free ends of said walls being separable a distance to enable the anchoring means to be snugly frictionally engaged on a vehicle fender, the resiliency of the anchoring means being such that the front wall and the back wall thereof provide substantially the total gripping force for maintaining the anchoring means on a vehicle fender while providing a rigid support base for the splash-intercepting body portion of the splash guard, and an outwardly extending pin-like member carried on the front wall of the resilient anchoring means for engaging and retaining said body portion on the anchoring means, said pin-like member being provided with means for securing and maintaining the body portion on the anchoring means.

2. A splash guard or mud flap according to claim 1 wherein at least one of the walls of the anchoring means is provided with inwardly extending retention means struck from said wall and adapted to resist disengagement of the anchoring means from a fender of a vehicle.

3. A splash guard or mud flap according to claim 1 wherein the body portion is fabricated of a material capable of being penetrated by the pin-like member of the anchoring means under finger-applied pressure, and the pin-like member of the anchoring means has a tapered end to facilitate penetration of the body portion by the pin-like member.

4. A splash guard or mud flap according to claim 1 wherein locking means is provided for the pin-like member, said locking means being adapted to be engaged on the pin-like member for securing and maintaining the body portion on the anchoring means.

5. A splash guard or mud flap according to claim 4 wherein the locking means comprises a cap member having a plurality of pin-engaging finger means which enable the cap member to be readily engaged on the pin-like member of the anchoring means while resisting disengagement of the cap member from the pin-like member.

6. A splash guard or mud flap as claimed in claim 1 wherein the pin-like member of the anchoring means is provided with external threads for receiving a nut-like retaining member for securing and maintaining the body portion on the anchoring means.

7. A splash guard or mud flap as claimed in claim 1 wherein the pin-like member of the anchoring means is formed with spreadable body portion engaging means which when spread serve to secure and maintain the body portion on the anchoring means.

8. A splash guard or mud flap according to claim 7 wherein the body portion engaging means of the pin-like member comprises a pair of bendable legs which when bent into overlying relation with respect to the body portion act to secure and maintain the body portion on the anchoring means.

9. A splash guard or mud flap according to claim 1 wherein the body portion is provided with guide means for enabling the body portion both to be properly positioned on the anchoring means and oriented in relation to the fender of a vehicle.

10. A splash guard or mud flap according to claim 1 wherein the body portion is formed of a material capable under pressure of being penetrated by the pin-like member of the anchoring means and is provided with guide means comprising spaced rows of areas of reduced thickness to enable the body portion to be properly positioned on the anchoring means and to facilitate penetration of the body portion by the pin-like member.

11. A splash guard or mud flap according to claim 1 wherein the body portion is provided with substantially vertically spaced openings along one margin thereof for receiving the pin-like member of the anchoring means.

12. A splash guard or mud flap according to claim 11 wherein the body portion comprises a flexible, metal splash-intercepting unit.

13. A splash guard or mud flap according to claim 1 wherein the body portion is fabricated of rubber, or rubber-like or plastics material.

14. A splash guard or mud flap according to claim 10 wherein the areas of reduced thickness comprising the spaced rows have a cross-sectional area which approximates that of the pin-like member of the anchoring means.

15. A splash guard or mud flap according to claim 1 wherein the opposed inner surfaces of the back and the front wall of the anchoring means are provided with inwardly extending spurs adapted to be partially embedded in the surface of a vehicle fender along which the anchoring means is positioned thereby to resist disengagement of the anchoring means from the fender.

16. A splash guard or mud flap for attachment to the fender of a vehicle, comprising: a flexible, splash-intercepting body portion, and resilient anchoring means for supporting the body portion and adapted to be engaged along the fender of a vehicle for positioning the body portion thereon, said anchoring means having a back wall and a front wall interconnected at one end, the free ends thereof being separable a distance sufficient to enable the anchoring means to be snugly engaged along the fender of a vehicle in a preselected position, said anchoring means including a pin-like member extending outwardly from the front wall thereof for engaging and retaining the body portion on the anchoring means, the front wall of the anchoring means having a plurality of pin-engaging finger means for retaining the pin-like member of the anchoring means in position thereon, said pin-like member being provided with means for securing and maintaining the body portion on the anchoring means.

17. A splash guard or mud flap for attachment to the fender of a vehicle comprising: a flexible, splash-intercepting body portion capable of being flexed to conform to the extend necessary to the curvature of a vehicle fender, and at least two generally U-shaped clip-like members each having a front wall and a back wall adapted to be resiliently engaged along the fender of a vehicle, a pin-like projection carried on the front wall of each of said members for engaging and retaining the body portion on the the clip-like members, said body portion being fabricated of a material capable under modest pressure of being fully penetrated by the pin-like projection of the clip-like members, and fastening means adapted to be engaged on said pin-like projection of the clip-like members for securing and maintaining the body portion on the clip-like members.

18. A splash guard or mud flap according to claim 17 wherein the body portion is fabricated of rubber, or rubber-like, or plastics material.

19. A splash guard or mud flap according to claim 17 wherein the fastening means comprises a push-on type nut having a plurality of finger-like extensions for engaging the pin-like projections on the clip-like members.

20. A splash guard or mud flap according to claim 17 wherein the pin-like projection of the clip-like members is provided with a tapered end to facilitate penetration of the projection through the material of the body portion.

21. Anchoring means for supporting a splash guard or mud flap on the fender of a vehicle, comprising: a resilient, generally U-shaped fender engaging member having a front wall and a back wall, and a pin-like projection carried on the front wall of the fender engaging member for supporting and retaining a splash guard or mud flap on the anchoring means, said pin-like projection having means for securing and maintaining a splash guard or mud flap on the anchoring means.

22. Anchoring means according to claim 21 wherein splash guard or mud flap fastening means is provided for the anchoring means, said fastening means being adapted to be received on the pin-like projection of the anchoring means and to secure the splash guard or mud flap thereon.

23. Anchoring means according to claim 21 wherein the arms of the U-shaped fender engaging member are provided with inwardly extending spurs for preventing the ready disengagement of the anchoring means from the fender of a vehicle.

* * * * *

REEXAMINATION CERTIFICATE (63rd)

United States Patent [19]
Matthew et al.

[11] B1 4,264,083
[45] Certificate Issued Mar. 22, 1983

[54] SPLASH GUARD
[75] Inventors: Kenneth S. Matthew, Northbrook; Harry J. Dickey, Bellwood, both of Ill.
[73] Assignee: Custom Accessories, Inc., Lincolnwood, Ill.

Reexamination Request
No. 90/000,164, Feb. 19, 1982

Reexamination Certificate for:
Patent No.: 4,264,083
Issued: Apr. 28, 1981
Appl. No.: 68,729
Filed: Aug. 22, 1979

Related U.S. Application Data
[63] Continuation-in-part of Ser. No. 60,977, Jul. 26, 1979.

[51] Int. Cl.³ ............................................. B62B 9/14
[52] U.S. Cl. ... 280/154.5 R; 24/73 SC; 24/81 FT; 24/150 P; 298/1 SG
[58] Field of Search ... 280/154.5 R; 24/73 BC, 24/73 SC, 73 SM, 81 FT, 241 S, 255 SC, 150 R, 150 P; 298/1 SG

[56] References Cited

U.S. PATENT DOCUMENTS

| | | | |
|---|---|---|---|
| 2,590,264 | 3/1952 | Meyers | 24/213 |
| 2,760,540 | 8/1956 | Poupitch | 151/41.75 |
| 2,775,010 | 12/1956 | Bedford | 24/73 |
| 2,888,971 | 6/1959 | Wootton | 151/41.75 |
| 2,974,383 | 3/1961 | Bright | 24/259 |
| 4,012,053 | 3/1977 | Bode | 280/154.5 R |
| 4,089,537 | 5/1978 | Pralutsky | 280/154.5 R |
| 4,293,140 | 10,1981 | Bell | 280/154.5 R |

OTHER PUBLICATIONS

"Snapguard" Publication, Published By Pretty Products, Inc., November, 1978.

*Primary Examiner*—Joseph F. Peters, Jr.

[57] ABSTRACT

A splash guard or mud flap comprising a flexible, splash-intercepting body portion which may be fabricated of a material such as rubber or plastic or metal, and which is supported on and maintained in a preselected position on the fender of a vehicle by means of anchoring members adapted to be engaged along the fender of the vehicle. The anchoring members have a projection or pin-like member thereon for engaging and retaining the flexible, splash-intercepting body portion on the anchoring members. In a preferred embodiment of the splash guard, the body portion is fabricated of a material such as rubber or plastic which can be fully penetrated by the pin-like member utilizing only finger pressure. Locking means in the form of a push-on type nut advantageously is provided for the members. The splash guard, in its preferred form, can quickly and properly be positioned on the fender of a vehicle without the need for any tool.

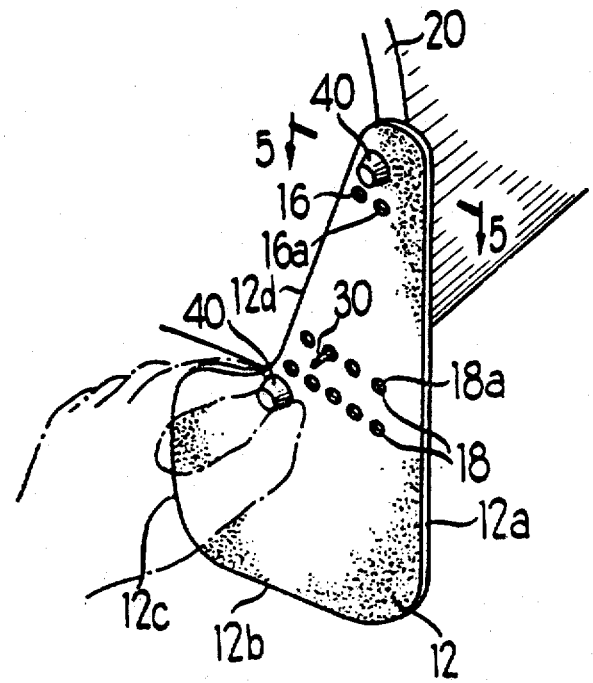

REEXAMINATION CERTIFICATE ISSUED UNDER 35 U.S.C. 307.

THE PATENT IS HEREBY AMENDED AS INDICATED BELOW.

Matter enclosed in heavy brackets appeared in the patent, but has been deleted and is no longer a part of the patent; matter printed in italics indicates additions made to the patent.

AS A RESULT OF REEXAMINATION, IT HAS BEEN DETERMINED THAT:

Claims 21–23 having been finally determined to be unpatentable, are cancelled.

Claims 1–20 are determined to be patentable as amended:

1. A splash guard or mud flap *assembly* for attachment to the fender of a *motor* vehicle, comprising: a flexible, splash-intercepting body portion [,]; resilient, *self-sustaining* anchoring means for supporting the body portion and being adapted to be *snugly* engaged along the fender of a *motor* vehicle for [positioning] *securing* the body portion *in a splash-intercepting position* thereon, said anchoring means including a front wall and a back wall resiliently integrally joined along one side in substantial overlying relation to one another *and converging in the direction of the free ends thereof,* the free ends of said walls being *resiliently* separable a distance to enable the anchoring means to be snugly frictionally engaged on a *motor* vehicle fender, the resiliency of the anchoring means being such that the front wall and the back wall thereof provide substantially the total gripping force for maintaining the anchoring means on a *motor* vehicle fender while providing a rigid support base for the splash-intercepting body portion of the splash guard, and an outwardly extending pin-like member carried on the front wall of the resilient anchoring means *in spaced, inward relation to the free ends of said walls of the anchoring means* for engaging and retaining said body portion on the anchoring means, said pin-like member being provided with *locking* means for securing and maintaining the *splash-intercepting* body portion on the anchoring means, *said locking means being characterized in that it overlies and is in contact with a sufficient area of the splash-intercepting body portion to resist any forces tending to dislodge said body portion from the pin-like member.*

2. A splash guard or mud flap *assembly* according to claim 1 wherein at least one of the walls of the anchoring means is provided with inwardly extending retention means struck from said wall and adapted to resist disengagement of the anchoring means from a fender of a vehicle.

3. A splash guard or mud flap *assembly* according to claim 1 wherein the body portion is fabricated of a material capable of being penetrated by the pin-like member of the anchoring means under finger-applied pressure, and the pin-like member of the anchoring means has a tapered end to facilitate penetration of the body portion by the pin-like member.

4. A splash guard or mud flap *assembly* according to claim 1 wherein [locking means is provided for the pin-like member,] said locking means [being] *is* adapted to be engaged on the pin-like member for securing and maintaining the body portion on the anchoring means.

5. A splash guard or mud flap [according to claim 4 wherein] *assembly for attachment to the fender of a motor vehicle, comprising: a flexible, splash-intercepting body portion, resilient anchoring means for supporting the body portion and being adapted to be engaged along the fender of a vehicle for positioning the body portion thereon, said anchoring means including a front wall and a back wall resiliently integrally joined along one side in substantial overlying relation to one another, the free ends of said walls being separable a distance to enable the anchoring means to be snugly frictionally engaged on a vehicle fender, the resiliency of the anchoring means being such that the front wall and the back wall thereof provide substantially the total gripping force for maintaining the anchoring means on a vehicle fender while providing a rigid support base for the splash-intercepting body portion of the splash guard, and an outwardly extending pin-like member carried on the front wall of the resilient anchoring means for engaging and retaining said body portion on the anchoring means, said pin-like member being provided with locking means adapted to be engaged thereon,* [the] *said* locking means [comprises] *comprising* a cap member having a plurality of pin-engaging finger means which enable the cap member to be readily engaged on the pin-like member of the anchoring means while resisting disengagement of the cap member from the pin-like member.

6. A splash guard or mud flap *assembly* as claimed in claim 1 wherein the pin-like member of the anchoring means is provided with external threads for receiving a nut-like retaining member for securing and maintaining the *splash-intercepting* body portion on the anchoring means, *said nut-like retaining member being characterized in that the base of the nut-like retaining member overlies and is in contact with a sufficient area of said body portion to resist any forces tending to dislodge the body from the pin-like member.*

7. A splash guard or mud flap *assembly* as claimed in claim 1 wherein the pin-like member of the anchoring means is formed with spreadable body portion engaging means which when spread serve to secure and maintain the body portion of the anchoring means.

8. A splash guard or mud flap *assembly* according to claim 7 wherein the body portion engaging means of the pin-like member comprises a pair of bendable legs which when bent into overlying relation with respect to the body portion act to secure and maintain the body portion on the anchoring means.

9. A splash guard or mud flap *assembly* according to claim 1 wherein the body portion is provided with guide means for enabling the body portion both to be properly positioned on the anchoring means and oriented in relation to the fender of a vehicle.

10. A splash guard or mud flap *assembly* according to claim 1 wherein the body portion is formed of a material capable under pressure of being penetrated by the pin-like member of the anchoring means and is provided with guide means comprising spaced rows of areas of reduced thickness to enable the body portion to be properly positioned on the anchoring means and to facilitate penetration of the body portion by the pin-like member.

11. A splash guard or mud flap *assembly* according to claim 1 wherein the body portion is provided with substantially vertically spaced openings along one margin thereof for receiving the pin-like member of the anchoring means.

12. A splash guard or mud flap *assembly* according to claim 11 wherein the body portion comprises a flexible, metal splash-intercepting unit.

13. A splash guard or mud flap *assembly* according to claim 1 wherein the body portion is fabricated of rubber, or rubber-like or plastics material.

14. A splash guard or mud flap *assembly* according to claim 10 wherein the areas of reduced thickness comprising the spaced rows have a cross-sectional area which approximates that of the pin-like member of the anchoring means.

15. A splash guard or mud flap *assembly* according to claim 1 wherein the opposed inner surfaces of the back and the front wall of the anchoring means are provided with inwardly extending spurs adapted to be partially embedded in the surface of a vehicle fender along which the anchoring means is positioned thereby to resist disengagement of the anchoring means from the fender.

16. A splash guard or mud flap *assembly* for attachment to the fender of a *motor* vehicle, comprising: a flexible, splash-intercepting body portion, and resilient, *self-sustaining* anchoring means for supporting the body portion and adapted to be engaged along the fender of a *motor* vehicle for positioning the body portion thereon, said anchoring means having a back wall and a front wall *resiliently* interconnected at one end, the free ends thereof *converging in a direction away from said interconnected one end of the back and front walls and* being separable a distance sufficient to enable the anchoring means to be snugly engaged along the fender of a vehicle in a preselected position, said anchoring means including a pin-like member extending outwardly *at substantially a right angle* from the front wall thereof for engaging and retaining the body portion on the anchoring means, the front wall of the anchoring means having a plurality of pin-engaging finger means for retaining the pin-like member of the anchoring means in position thereon, said pin-like member being provided with *locking* means for securing and maintaining the *splash-intercepting* body portion on the anchoring means, *said locking means being characterized in that it overlies and is in contact with a sufficient area of the splash-intercepting body portion to resist any forces tending to dislodge said body portion from the pin-like member.*

17. A splash guard or mud flap *assembly* for attachment to the fender of a *motor* vehicle comprising: a flexible, splash-intercepting body portion capable of being flexed to conform to the extent necessary to the curvature of a *motor* vehicle fender, and at least two generally U-shaped, *self-sustaining* clip-like members each having a front wall and a back wall adapted to be resiliently engaged along the fender of a vehicle, a pin-like projection *extending outwardly at substantially a right angle* [carried on] *from* the front wall of each of said members for engaging and retaining the body portion on the clip-like members, said body portion being fabricated of a material capable under modest pressure of being fully penetrated by the pin-like projection of the clip-like members, and fastening means adapted to be engaged on said pin-like projection of the clip-like members for securing and maintaining the *splash-intercepting* body portion on the clip-like members, *said fastening means being characterized in that it overlies and is in contact with a sufficient area of the splash-intercepting body portion to resist any forces tending to dislodge said body portion from the pin-like member.*

18. A splash guard or mud flap *assembly* according to claim 17 wherein the body portion is fabricated of rubber, or rubber-like, or plastics material.

19. A splash guard or mud flap *assembly* according to claim 17 wherein the fastening means comprises a push-on type nut having a plurality of finger-like extensions for engaging the pin-like projections on the clip-like members.

20. A splash guard or mud flap *assembly* according to claim 17 wherein the pin-like projection of the clip-like members is provided with a tapered end to facilitate penetration of the projection through the material of the body portion.

* * * * *

REEXAMINATION CERTIFICATE (1324th)
United States Patent [19]
[11] B2 4,264,083

Matthew et al.  [45] Certificate Issued  Jul. 17, 1990

[54] SPLASH GUARD

[75] Inventors: Kenneth S. Matthew, Northbrook; Harry J. Dickey, Bellwood, both of Ill.

[73] Assignee: Custom Accessories, Inc.

Reexamination Request:
No. 90/001,798, Jun. 22, 1989

Reexamination Certificate for:
Patent No.: 4,264,083
Issued: Apr. 28, 1981
Appl. No.: 68,729
Filed: Aug. 22, 1979

Reexamination Certificate B1 4,264,083 issued Mar. 22, 1983.

[51] Int. Cl.⁵ ................................................. B62B 9/16
[52] U.S. Cl. .................................. 280/851; 24/707.5; 298/1 SG; 411/517
[58] Field of Search .......................... 280/851, 852, 154

[56] References Cited

U.S. PATENT DOCUMENTS

| | | | |
|---|---|---|---|
| 1,904,343 | 4/1933 | Zaiger | 280/851 |
| 1,934,135 | 11/1933 | McCollum | 280/154.5 R |
| 1,993,067 | 3/1935 | Littlefield | 280/154.5 R |
| 2,077,818 | 4/1937 | Zaiger | 280/857 |
| 2,218,690 | 10/1940 | Strauch | 280/152 R |
| 2,334,046 | 11/1943 | Tinnerman | 411/374 |
| 2,335,058 | 11/1943 | Haltenberger | 280/153 R X |
| 2,559,755 | 7/1951 | Bratz | 280/152 R |
| 2,590,264 | 3/1952 | Meyers | 24/213 |
| 2,760,540 | 8/1956 | Poupitch | 151/41.75 |
| 2,775,010 | 12/1956 | Bedford | 24/73 |
| 2,888,971 | 6/1959 | Wooten | 151/41.75 |
| 2,974,383 | 3/1961 | Bright | 24/259 |
| 3,279,818 | 10/1966 | Jones | 280/851 |
| 3,711,119 | 1/1973 | Hollingsworth | 280/154.5 R |
| 4,012,053 | 3/1977 | Bode | 280/851 |
| 4,089,537 | 5/1978 | Pralutsky | 280/851 |
| 4,293,140 | 10/1981 | Bell | 280/851 |

FOREIGN PATENT DOCUMENTS

| | | |
|---|---|---|
| 43161 | 1/1978 | Canada . |
| 2529718 | 1/1977 | Fed. Rep. of Germany . |
| 2410591 | 8/1979 | France . |
| 7707829 | 8/1978 | Netherlands . |

OTHER PUBLICATIONS

Tinnerman Products, Inc., Bulletin No. 359, p. 18, printed 1961.
"Snapguard" Publication, published by Pretty Products, Inc.; Nov., 1978.

Primary Examiner—David M. Mitchell

[57] ABSTRACT

A splash guard or mud flap comprising a flexible, splash-intercepting body portion which may be fabricated of a material such as rubber or plastic or metal, and which is supported on and maintained in a preselected position on the fender of a vehicle by means of anchoring members adapted to be engaged along the fender of the vehicle. The anchoring members have a projection or pin-like member thereon for engaging and retaining the flexible, splash-intercepting body portion on the anchoring members. In a preferred embodiment of the splash guard, the body portion is fabricated of a material such as rubber or plastic which can be fully penetrated by the pin-like member utilizing only finger pressure. Locking means in the form of a push-on type nut advantageously is provided for the members. The splash guard in its preferred form, can quickly and properly be positioned on the fender of a vehicle without the need for any tool.

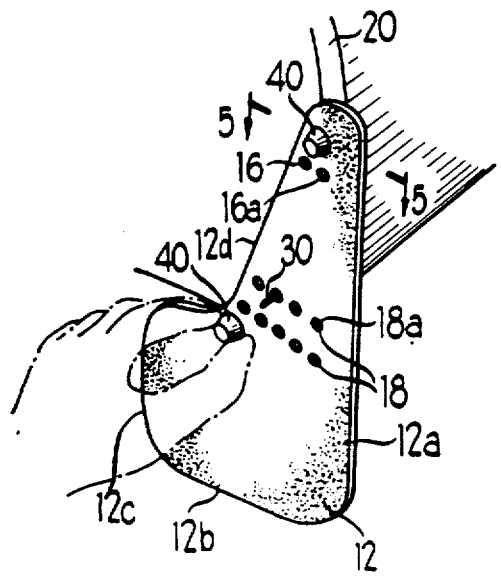

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-20 is confirmed.

* * * * *